United States Patent
Taylor et al.

(10) Patent No.: US 7,095,878 B1
(45) Date of Patent: Aug. 22, 2006

(54) OBJECT CLASS IDENTIFICATION, VERIFICATION OF OBJECT IMAGE SYNTHESIS

(75) Inventors: Christopher John Taylor, Stockport (GB); Timothy Francis Cootes, Stockport (GB); Gareth Edwards, Derbyshire (GB)

(73) Assignee: The Victoria University of Manchester, Manchester (GB)

( * ) Notice: Subject to any disclaimer, the term of this patent is extended or adjusted under 35 U.S.C. 154(b) by 682 days.

(21) Appl. No.: 10/129,609

(22) PCT Filed: Nov. 9, 2000

(86) PCT No.: PCT/GB00/04295

§ 371 (c)(1),
(2), (4) Date: Jul. 24, 2002

(87) PCT Pub. No.: WO01/35326

PCT Pub. Date: May 17, 2001

(30) Foreign Application Priority Data

Nov. 9, 1999 (GB) ................................. 9926459.0
Jul. 21, 2000 (GB) ................................. 0017966.3

(51) Int. Cl.
*G06K 9/00* (2006.01)
*G06K 9/62* (2006.01)

(52) U.S. Cl. ......................... 382/118; 382/159; 382/224

(58) Field of Classification Search ................ 382/118, 382/224, 159
See application file for complete search history.

(56) References Cited

U.S. PATENT DOCUMENTS 6,044,168 A * 3/2000 Tuceryan et al. ............ 382/118
6,741,756 B1 * 5/2004 Toyama et al. ............. 382/291

OTHER PUBLICATIONS

Cootes, T., Taylor, C., Cooper, D., Graham, J., "Active Shape Models—Their Training and Applicaiton" Computer Vision and Image Understanding, vol. 61, No. 1, Jan. 1995, pp.38-59.*
Moghaddam, B., Pentland, A., "Probabilistic Visual Learning for Object Representation", IEEE transactions on Pattern Analysis and Machine Intelligence, vol. 19, No. 7, Jul. 1997, pp. 696-710.*
Cootes, T., Edwards, G., Taylor, C., "Active Appearance Models" Proc. European Conference on Computer Vision 1998 (H.Burkhardt & B. Neumann Ed.s). vol. 2, pp. 484-498, Springer,1998.*
G.J.Edwards, C.J.Taylor, T.F.Cootes, "Learning to Identify and Track Faces in Image Sequences", Int. Conf. on Face and Gesture Recognition 1998, pp. 260-265.*
Cootes et al; "A Mixture Model for Representing Shape Variation"; Elsvier, Netherlands, vol. 17, No. 8, pp. 567-573, XP000986825.
Morishima et al; "Emotion Space for Analysis and Synthesis of Facial Expression" IEEE International Workshop on Robot and Human Communication, XX, XX, 1993, pp. 188-193, XP000978421.
Cootes et al; "Active Shape Models-Their Training and Application"; Computer Vision and Image Understanding, Jan. 1995, USA, vol. 61, No. 1, pp. 38-59, XP000978654.
Lanitis et al; "An Automatic Face Indentification System Using Flexible Appearance Models"; Proceedings of the British Machine Vision Conference: 1994, XP000886482.
Matthetw; "Video Compression Techniques"; Electronics World and Wireless World, GB, Reed Business Publishing, Sutton, Surrey; vol. 102, No. 1719, Feb. 1, 1996, pp. 102-108, XP000553555.
Nishino et al; "Eigen-Texture Method: Appearance Compression Based on 3D Model" Proceedings of the IEEE Computer Society Conference on Computer Vision and Pattern Recognition, US, Los Alamitos, CA, IEEEComp. Soc. Press, 23, Jun. 1999, pp. 618-624, XP000870603.
Cootes et al; "Active Appearance Models" European Conference on Computer Vision , DE, Berlin, vol. 2, No. 1, 1998, pp. 484-498, XP000884426.
Moghaddam et al; "Probabilistic Visual Learning for Object Representation" IEEE Transactions on Pattern Analysis and Machine Intelligence, US, IEEE Inc. New York, vol. 19, No. 7, Jul. 1, 1997, pp. 696-710, XP000698169.
Moghaddam et al; "Beyound Eigenfaces: Probabilistic Matching for Face Recognition" Proceedings of the International Conference on Automatic Face and Gesture Recognition, 1998, XP000884293.

* cited by examiner

*Primary Examiner*—Bhavesh M. Mehta
*Assistant Examiner*—Utpal Shah
(74) *Attorney, Agent, or Firm*—Nixon & Vanderhye P.C.

(57) ABSTRACT

A method of identifying an object class uses a model based upon appearance parameters derived by comparing images of objects of different classes. The model includes a representation of a probability density function describing a range over which appearance parameters may vary for a given class of object, the model further including a defined relationship between the appearance parameters and the probability density function. The method generates appearance parameters representative of an unknown object, estimates an appropriate probability density function for the unknown object using the defined relationship between the appearance parameters and the probability density function, then iteratively modifies at least some of the appearance parameters within limits determined using the probability density function to identify the object class.

21 Claims, No Drawings

OBJECT CLASS IDENTIFICATION, VERIFICATION OF OBJECT IMAGE SYNTHESIS

BACKGROUND

1. Technical Field

The present invention relates to the identification or verification of an object class, and relates also to the synthesis of images of objects. The invention relates particularly though not exclusively to the identification or verification of faces, and relates also to the synthesis of images of faces.

2. Related Art

Many known methods of face identification utilise a universal face space model indicative of facial features of a non-homogeneous population. Commonly, the universal face space model is represented as a set of appearance parameters that are best able to represent variations between faces in a restricted dimensional space (see For example U.S. Pat. No. 5,164,992; M. A. Turk and A. P. Pentland). A face to be identified is converted into a set of appearance parameters and then compared with sets of appearance parameters indicative of known faces.

Recently published face identification methods include the active appearance method and active shape method (G. J. Edwards, C. J. Taylor, and T. F. Cootes. Face recognition using Active Appearance Models. In $5^{th}$ *European Conference on Computer Vision*, pages 581–595, 1998; T. F. Cootes, C. J. Taylor, D. H. Cooper, and J. Graham. Active Shape Models—their training and application. *Computer Vision and Image Understanding*, 61(1):38–59, January 1995). The active appearance method comprises a universal face space model with which an unknown face is compared, and further includes pre-learned knowledge indicating how to adjust appearance parameters in universal face space in order to match a face synthesised using the model to an unknown face. Using the pre-learned knowledge is advantageous because it allows the required number adjustment iterations to be minimised.

If the facial appearance of each individual was unchanging, and every image of each individual was identical, then each individual could be represented by a single point in universal face space. However, the facial appearance of an individual may vary in response to a number of factors, for example changes of expression, pose or illumination. The variability of appearance parameters representative of the appearance of an individual under changes of expression, pose, illumination or other factors can be expressed as a probability density function. The probability density function defines a volume in universal face space which is considered to correspond to a given individual. So for example, a series of images of an individual, with a variety of expressions should all fall within the volume described by the probability density function in universal face space.

In known face identification methods a single probability density function is generated which is applied to all individuals. This is done centering the probability density function on a mean parameter vector for a given individual.

BRIEF SUMMARY

It is an object of the first aspect of the invention to provide an improved object class identification or verification method.

According to a first aspect of the invention there is provided a method of identifying an object class using a model based upon appearance parameters derived by comparing images of objects of different classes, the model including a representation of a probability density function describing a range over which appearance parameters may vary for a given class of object, the model further including a defined relationship between the appearance parameters and the probability density function, wherein the method comprises generating appearance parameters representative of an unknown object, estimating an appropriate probability density function for the unknown object using the defined relationship between the appearance parameters and the probability density function, then iteratively modifying at least some of the appearance parameters within limits determined using the probability density function to identify the object class.

The method according to the first aspect of the invention provides enhanced identification of the class of an unknown object.

Preferably, a threshold level of the probability density function is determined, and the appearance parameters are constrained to have a probability density greater than the threshold.

Suitably, the objects are faces, and a given class of object is a face having a particular identity. The objects may alternatively be hands, livestock, cars, etc. In each case, the class of object is a specific example of that object, for example a particular person's hand, a particular horse, or a particular model of car.

The first aspect of the invention is advantageous because it uses the fact that different individual's faces will vary in different ways, to limit the range over which appearance parameters may vary when identifying a face.

Suitably, the relationship between the appearance parameters and the probability density function is a relationship between average appearance parameters determined for each class of object, and probability density functions associated with each class of object.

The probability density function may be any suitable function, for example a Gaussian function.

Suitably, the probability density function is approximated as a Gaussian with a given covariance matrix.

Suitably, the model is the Active Appearance Model. The model may alternatively be the Active Shape Model.

The first aspect of the invention may also be used for example to improve tracking of individuals by taking into account the predicted variability in the appearance of a given individual. By providing stronger constraints on the expected variation in appearance of an individual, matching the model to an image or a sequence can be made more robust.

According to a second aspect of the invention there is provided a method of verifying the identity of an object class using a model based upon appearance parameters derived by comparing images of objects of different classes, the model including a representation of a probability density function describing the variation of appearance parameters for a given class of object, the model further including a defined relationship between the probability density function and the appearance parameters, wherein for an object class for which verification will subsequently be required, the method comprises using a series of images of that object class to generate a representation of a specific probability density function describing the variation of appearance parameters for that object class and, during subsequent verification of the object class, comparing an image of an object of an unknown class with the object of known class by generating appearance parameters representative of the object of unknown class and iteratively modifying at least some of the appearance parameters within limits determined using the specific probability density function.

The term 'verification' is intended to mean that the class of an unknown object is checked to see whether it corresponds with a particular object class.

Preferably, a threshold level of the probability density function is determined, and the appearance parameters are constrained to have a probability density greater than the threshold.

Suitably, the objects are faces, and a given class of object is a face having a particular identity. The objects may alternatively be hands, livestock, cars, etc. In each case, the class of object is a specific example of that object, for example a particular person's hand, a particular horse, or a particular model of car.

The second aspect of the invention is advantageous because it uses the fact that different individual's faces will vary in different ways, to limit the range over which appearance parameters may vary when verifying the identity of a face.

The method according to the second aspect of the invention may provide improved verification of the class of an unknown object. For example the face of a given individual may have appearance parameters that all fall within a relatively compact probability density function. The model according to the second aspect of the invention will only verify that an image is an image of that individual's face if its appearance parameters fall within that compact probability density function. A prior art verification method using a single global probability density function, which will have a greater volume, may erroneously verify the identity of an image of an individual, if the appearance parameters fall within the global probability density function (the verification will be erroneous if the appearance parameters would have fallen outside of the relatively compact probability density function that would have been provided by the second aspect of the invention).

Suitably, the relationship between the appearance parameters and the probability density function is a relationship between average appearance parameters determined for each class of object, and probability density functions associated with each class of object.

The probability density function may be any suitable function, for example a Gaussian function.

Suitably, the probability density function is approximated as a Gaussian with a given covariance matrix.

Suitably, the model is the Active Appearance Model. The model may alternatively be the Active Shape Model.

According to a third aspect of the invention there is provided a method of generating a synthesised image of an object class using a model based upon appearance parameters derived by comparing images of objects of different classes, the model including a representation of a probability density function describing the variation of appearance parameters for a given class of object, the model further including a defined relationship between the probability density function and the appearance parameters, wherein for an object class to be synthesised, the method comprises using a series of images of that object class to generate a representation of a specific probability density function describing the variation of appearance parameters for that object class, wherein the synthesised image of the object class is generated using appearance parameters confined within limits determined using the specific probability density function.

The third aspect of the invention is advantageous because it provides object class specific limits within which appearance parameters of the synthesised image should lie.

Preferably, a threshold level of the probability density function is determined, and the appearance parameters are constrained to have a probability density greater than the threshold.

Suitably, the objects are faces, and a given class of object is a face having a particular identity. The objects may alternatively be hands, livestock, cars, etc. In each case, the class of object is a specific example of that object, for example a particular person's hand, a particular horse, or a particular model of car.

The third aspect of the invention is advantageous because it uses the fact that different individual's faces will vary in different ways, to limit the range over which appearance parameters may vary when synthesising an image of a face.

Suitably, the relationship between the appearance parameters and the probability density function is a relationship between average appearance parameters determined for each class of object, and probability density functions associated with each class of object.

The probability density function may be any suitable function, for example a Gaussian function.

Suitably, the probability density function is approximated as a Gaussian with a given covariance matrix.

Suitably, the model is the Active Appearance Model. The model may alternatively be the Active Shape Model.

In general, a large number of appearance parameters are required to represent faces with sufficient detail to allow good face recognition. An alternative way of saying this is that a universal face space model must have a large number of dimensions in order to represent faces with sufficient detail to allow good face recognition.

Typically, around 100 appearance parameters are required to represent faces in universal face space model with sufficient detail to allow accurate identification of faces. However, the number of appearance parameters that vary significantly for a given individual face is much less than 100 (typically it is 30), and the remaining appearance parameters (typically 70) are substantially redundant. Existing face identification models attempt to identify a face by varying all of the appearance parameters that make up the universal face space model. Similarly, all available appearance parameters are varied when attempting to identify the class of an object other than a face.

It is an object of the fourth aspect of the invention to provide an improved object class verification method.

According to a fourth aspect of the invention there is provided a method of verifying the identity of a class of an object using a model based upon appearance parameters derived by comparing images of objects of different classes, the method comprising comparing an object of an unknown class with an object of a known class which has been incorporated into the model, wherein the appearance parameters are transformed into a set of transformed parameters defined in a new co-ordinate space, the new co-ordinate space being chosen such that a plurality of the transformed parameters do not vary in that co-ordinate space, the transformed parameters being compared with a set of parameters representing the object of known class in that co-ordinate space.

The inventors have realised that a lesser number of degrees of freedom are required when verifying whether an image is of an object of a given class (for example, verifying the identity of an individual using an image of that individual's face), than are required to recognise an object class in an image containing an object of an unknown class (for example, attempting to recognise the identity of a face contained in an image). Furthermore, by rotating the co-ordinate space, the number of parameters that must be varied in order to verify the identity of a class of an object may be reduced significantly.

Suitably, the objects are faces, and a given class of object is a face having a particular identity. The objects may alternatively be hands, livestock, cars, etc. In each case, the class of object is a specific example of the object, for example a particular person's hand, a particular horse, or a particular model of car.

Suitably, the model is the Active Appearance Model. The model may alternatively be the Active Shape Model.

When the method according to the fourth aspect of the invention is used, the number of parameters required for verification is typically reduced from approximately 100 to approximately 30. The fourth aspect of the invention thus makes it possible to perform image matching using a model 'tuned' to a specific individual (i.e. using a new co-ordinate space which minimises the number of transformed parameters required for verification of that individual). This provides faster and more reliable verification.

According to a fifth aspect of the invention there is provided a method of transmitting a series of images of an object of a given class using a model based upon appearance parameters derived by comparing images of objects of different classes, wherein appearance parameters are transformed into a set of transformed parameters defined in a new co-ordinate space, the new co-ordinate space being chosen such that a plurality of the transformed parameters do not vary in that co-ordinate space, transformed parameters which do not vary are transmitted to a receiver together with a description of the transformation, and transformed parameters which do vary are subsequently transmitted to the receiver for each image of the series of images, an inverse transformation being used to transform the received transformed parameters back to appearance parameters at the receiver.

Preferably, the appearance parameters are used to generate a synthesised image at the receiver.

According to a sixth aspect of the invention there is provided a method of storing a series of images of an object of a given class using a model based upon appearance parameters derived by comparing images of objects of different classes, wherein appearance parameters are transformed into a set of transformed parameters defined in a new co-ordinate space, the new co-ordinate space being chosen such that a plurality of the transformed parameters do not vary in that co-ordinate space, transformed parameters which do not vary are stored at a storage medium together with a description of the transformation, and transformed parameters which do vary are also stored at the storage medium for each image of the series of images.

Suitably, the transformation is a linear transformation.

Alternatively, the transformation is a non-linear transformation.

Preferably, the objects are faces, and a given class of object is a face having a particular identity.

Preferably, the model is the Active Appearance Model.

The Active Appearance Model is a known face identification method (G. J. Edwards, C. J. Taylor, and T. F. Cootes. Face recognition using Active Appearance Models. In *5th European Conference on Computer Vision*, pages 581–595, 1998). During training of the Active Appearance Model, differences between a synthetic image and a target image are monitored, and a regression matrix relating displacement of the synthetic image (generated by appearance parameters) to the measured differences between the synthetic image and target image is determined. During object identification using the Active Appearance Model, the regression matrix is used to drive the model to an object class identification which gives a minimal error.

It is an object of the seventh aspect of the invention to provide an improved object class identification method.

According to a seventh aspect of the invention there is provided a method of identifying an object class using a model based on appearance parameters derived by comparing images of objects of different classes, the model including a pre-learned estimated relationship describing the effect of perturbations of the appearance parameters upon an image difference, the image difference comprising a set of elements describing the difference between an image of an object generated according to the model and an image of the object itself, wherein a specific relationship is pre-learned for a specific class of object, and a different specific relationship is pre-learned for a different class of object.

Suitably, the relationship is defined as a regression matrix.

Suitably, the objects are faces, and a given class of object is a face having a particular identity. The objects may alternatively be hands, livestock, cars, etc. In each case, the class of object is a specific example of the object, for example a particular person's hand, a particular horse, or a particular model of car.

The seventh aspect of the invention is advantageous because it provides a regression matrix which is specific to an object class. In the case of face recognition, the regression matrix is specific to a face having a particular identity, and this provides a more robust and accurate search.

Each aspect of the invention, as described above is useful in isolation. However, the aspects of the invention can be combined together to provide faster and more robust object class identification and/or verification.

The first aspect of the invention can be used to provide an object class specific probability density function, which may then be used by the method according to the fourth aspect of the invention or the method according to the seventh aspect of the invention.

DETAILED DESCRIPTION OF EXEMPLARY EMBODIMENTS

A specific embodiment of the first and second aspects of the invention will now be described by way of example only.

The invention may be applied to a model based upon a universal face space model indicative of facial features of a non-homogeneous population.

The variability of appearance parameters for a face of a given identity, under changes in expression, pose, illumination etc, can be expressed in universal face space model as a probability density function (PDF). It is assumed that, for a PDF centred on the average appearance values of a given face that any expression, pose or illumination of that face should be described by appearance parameters that lie within the PDF.

In prior art face recognition methods, a single PDF is used to describe the variation of all faces irrespective of identity. However, in practise, different faces will vary in different ways. The first aspect of the invention takes account of this by defining a relationship between the appearance parameters representative of different individual's faces and their PDF's. This allows a PDF specific to a particular face to be predicted for an unknown face on the basis of a single image of that face.

The model includes PDF's computed for certain faces for which there are many examples, including variations in pose, illumination, expression, etc. These 'well-known' faces are at various locations in the universal face space (as defined by appearance parameters). The model learns a relationship between PDF's associated with particular faces, and the location of those faces in the universal face space. The location in the universal face space of a particular face may be defined for example as the average value of the appearance parameters representative of that face.

During face identification using the model a PDF for an unknown face is estimated, on the basis of the position of one or more appearance parameters representing the unknown face. This gives a face-specific PDF which describes how a particular face is likely to vary, which allows more efficient identification of the face. The face-specific PDF may be determined even when only a single image of the unknown face has been seen.

An embodiment of the first aspect of the invention may be expressed mathematically as follows:

Let c be a vector of appearance model parameters.

Let $p(c|x)$ be a PDF for the parameters, c, itself parameterised by a vector of parameters, x.

For example, the PDF could be a Gaussian with covariance matrix $S=S(x)$.

Models may include, but are not restricted to:
a) A model with one scaling parameter, $x_1$, $S(x_1)=x_1 S_0$.
b) Representing the eigenvalues of the covariance matrix by x, i.e. $S(x)=P^t \text{diag}(x)P$ (where P is an orthogonal matrix).

Assume the model is provided with $m_i$ example face images from each of n individuals (i=1 ... n). Let $y_i$ be the mean of these m, vectors for individual i.

For each individual, i, the parameters $x_i$ of the PDF's about the mean, $y_1$ are found.

The model learns the relationship between the mean position in the space, $y_i$, and the parameters of the PDF, $x_i$:

$$x=f(y)$$

The relationship can be learnt with any suitable method, for example multivariate linear regression, neural networks, etc. Given sufficient data, complex non-linear relationships can be learnt.

Thus, given a single image of an individual, the model is able to learn the face parameters, y, and can then estimate the associated PDF as $p(c|f(y))$.

The PDF can be used for classification/identification in a standard maximum likelihood classifier framework in which an object represented by parameters, c, is classified as the class j which gives the largest value of $p_j(c)$ where $p_j( )$ is the PDF for the j'th class.

The invention may be used for example to improve recognition of individuals by taking into account the predicted variability in the appearance of a given individual.

The invention may also be used for example to improve tracking of individuals by taking into account the predicted variability in the appearance of a given individual. By providing stronger constraints on the expected variation in appearance of an individual, matching the model to an image or a sequence can be made more robust.

Similarly, the invention may also be applied to the synthesis of a known face, and allows the predicted variability in the appearance of a given individual to be taken into account. A synthesised face may be used for example as part of a computer game, or as part of a general user-computer interface. The synthesised face could be the face of the user.

The invention also relates to using an appropriate PDF for verification purposes. The PDF can be used for verification by accepting an object with parameters c as a valid example of the class if $p(c)>t_0$; where $t_0$ is a predetermined threshold. Where verification is required, the PDF of a specific object class is first determined using a series of images of that object class. Once this has been done, verification may be carried out on subsequent occasions by obtaining a single image of the object and applying the model within the constraints of the PDF specific to that object class.

The invention also relates to using an appropriate PDF for synthesis purposes. An image of an object is synthesised by converting appearance parameters representative of that object in universal face space into a two-dimensional intensity representation of the object. The appearance parameters are confined within limits determined by the specific probability density function of the relevant object class.

An embodiment of the fourth aspect of the invention relates to face verification. In general, the appearance of a face can be represented by a vector of n appearance model parameters, c. However, the appearance of an individual face can only vary in a limited number of ways, and so can be modelled as $c=c_0+Bb$, where b is a k dimensional vector, k<n, B is a n×k matrix, and co is the mean appearance for the individual.

When searching for a known individual (i.e. attempting to verify the identity of an individual), it is only required to find the k parameters of b which best match the model to the image, rather than the n parameters of the full c. For faces, n≈1100 and k≈30, and the fourth aspect of the invention therefore leads to faster and more reliable face matching.

Although the invention is described in terms of a linear transformation, any suitable transformation of the form $c=f(b)$ may be used.

The invention is useful when a series of images of a face, for example a moving face image, is to be transmitted via a telephone line. The face of a caller is filmed by a camera, and is converted into a set of appearance parameters. The set of appearance parameters is transformed to a set of transformed parameters in a new co-ordinate space prior to transmission. A first part of the transmission comprises those transformed parameters which do not vary in the new co-ordinate space, together with a description of the transformation. A second part of the transmission comprises those transformed parameters which do vary in the new co-ordinate space; these parameters are transmitted for each image of the series.

The transformed parameters are transmitted to the receiver, where they are transformed back to appearance parameters which are used to synthesise the image.

The number of transformed parameters needed to transmit a given image to the receiver is significantly less than the number of appearance model parameters that would be needed to transmit the same image. This allows a lower bandwidth connection between transmitter and receiver to be used, or alternatively allows the image to be updated more frequently. When the update rate of a face image is increased, the face image will look more realistic, and differences between successive face images will be less, making tracking of the face by a camera more robust.

The invention may also be applied to tracking known faces. The reduction in the number of parameters required to represent the face allows faster and more robust tracking, which is of value in such applications as video-phones (in which a face tracked at one end is encoded into a small number of parameters, b, which are transmitted to the receiver, where they are used to reconstruct a synthetic face which mimics the original). The transformation required to convert the b parameters to c parameters must also be transmitted to the receiver.

The invention is of benefit when used to synthesize a known face. The reduction in the number of parameters b required to represent the face allows faster synthesis, which reduces the required computational load. A synthesised face may be used for example as part of a computer game, or as part of a general user-computer interface. The synthesised face could be the face of the user.

All of the above methods the invention may be applied to the Active Appearance Model (G. Edwards, C. Taylor, and T. Cootes. Interpreting face images using active appearance models. In $3^{rd}$ *International Conference on Automatic Face and Gesture Recognition* 1998, pages 300–305, Nara, Japan, April 1998. IEEE Computer Society Press) and described further by Cootes et al (T. Cootes, G. J. Edwards, and C. J. Taylor. Active appearance models. In $5^{th}$ *European Conference on Computer Vision*, pages 484–498. Springer, June 1998).

The Active Appearance Model uses the difference between a reconstructed image generated by a model and an underlying target image, to drive model parameters towards better values. In a prior learning stage, known displacements, c, are applied to known model instances and the resulting difference between model and image, v, is measured. Multivariate linear regression is applied to a large set of such training displacements and an approximate linear relationship is established:

$$\delta c = R \delta v$$

When searching an image, the current difference between model and image, v, is used to predict an adjustment, −c, to the model parameters which improves model fit. For simplicity of notation, the vector c is assumed to include displacements in scale, rotation, and translation.

The Active Appearance Model was constructed using sets of face images. To do this, Facial appearance models were generated following the approach described by Edwards et al (G. Edwards, A. Lanitis, C Taylor and T. Cootes, Statistical model of face images—improving specificity. *Image and Vision Computing*, 16:203–211, 1998). The models were generated by combining a model of face shape variation with a model of the appearance variations of a shape-normalised face. The models were trained on 400 face images, each labelled with 122 landmark points representing the positions of key features. The shape model was generated by representing set of landmarks as a vector, x and applying a principal component analysis (PCA) to the data. Any example can then be approximated using:

$$x = \bar{x} + P_s b_s \quad (1)$$

where $\bar{x}$ is the mean shape, $P_s$ is a set of orthogonal modes of variation and $b_s$ is a set of shape parameters. Each example image was warped so that its control points matched the mean shape (using a triangulation algorithm), and the grey level information g was sampled from this shape-normalised face patch. By applying PCA to this data a similar model was obtained:

$$g = \bar{g} + P_g b_g \quad (2)$$

The shape and appearance of any example can thus be summarised by the vectors $b_s$ and $b_g$. Since there are correlations between the shape and grey-level variations, a further PCA was applied to the concatenated vectors, to obtain a combined model of the form:

$$x = \bar{x} + Q_s c \quad (3)$$

$$g = \bar{g} + Q_g c \quad (4)$$

where c is a vector of appearance parameters controlling both the shape and grey-levels of the model, and $Q_s$ and $Q_g$ map the value of c to changes in the shape and shape-normalised grey-level data. A face can be synthesised for a given c by generating the shape-free grey-level image from the vector g and warping it using the control points described by x (this process is described in detail in G. J. Edwards, C. J. Taylor and T. Cootes, Learning to Identify and Track Faces in Image Sequences. In British Machine Vision Conference 1997, Colchester, UK, 1997).

The 400 examples lead to 23 shape parameters, $b_s$, and 114 grey-level parameters, $b_g$. However, only 80 combined appearance model parameters, c, are required to explain 98% of the observed variation.

Once the appearance model has been generated, it may be used to identify faces and to generate representations of faces.

A two-stage strategy is adopted for matching an appearance model to face images. The first step is to find an approximate match using a simple and rapid approach. No initial knowledge is assumed of where the face may lie in the image, or of its scale and orientation. A simple eigenface model (M. Turk and A. Pentland. Eigenfaces for recognition. *Journal of Cognitive Neuroscience*, 3(1):71–86, 1991) may be used for this stage of the location. A correlation score, S, between the eigenface representation of the image data, M and the image itself, I can be calculated at various scales, positions and orientations:

$$S = |I - M^2| \quad (5)$$

Although in principle the image could be searched exhaustively, it is much more efficient to use a stochastic scheme similar to that of Matas et al (K. J. J. Matas and J. Kittler. Fast face localisation and verification. In *British Machine Vision Conference* 1997, Colchester, UK, 1997). Both the model and image are sub-sampled to calculate the correlation score using only a small fraction of the model sample points.

Once a reasonable starting approximation of the position of a face has been determined, the appearance model is then used to identify the face. The parameters of the appearance model are adjusted, such that a synthetic face is generated which matches the image as closely as possible. The basic idea is outlined below, followed by details of the algorithm.

Interpretation is treated as an optimisation problem in which the difference between a real face image and one synthesised by the appearance model is minimised. A difference vector $\delta I$ can be defined:

$$\delta I = I_i - I_m \quad (6)$$

where $I_i$ is the vector of grey-level values in the image, and $I_m$ is the vector of grey-level values for the current model parameters.

To locate a best match between model and image, the magnitude of the difference vector, $\Delta = |\delta I^2|$, is minimised by varying the model parameters, c.

Since the model has around 80 parameters, this appears at first to be a very difficult optimisation problem involving search in a very high-dimensional space. However, it is noted that each attempt to match the model to a new face image, is actually a similar optimisation problem. Therefore, the model learns something about how to solve this class of problems in advance. By providing a-priori knowledge of how to adjust the model parameters during image search, it arrives at an efficient run-time algorithm. In particular, it might be expected that the spatial pattern in $\delta I$, to encode information about how the model parameters should be changed in order to achieve a better fit. For example, if the largest differences between the model and the image occurred at the sides of the face, that would imply that a parameter that adjusted the width of the model face should be adjusted.

In adopting this approach there are two parts to the problem: learning the relationship between $\delta I$ and the error in the model parameters, $\delta c$ and using this knowledge in an iterative algorithm for minimising $\Delta$.

The simplest model that could be chosen for the relationship between $\delta I$ and the error in the model parameters (and thus the correction which needs to be made) is linear:

$$\delta c = R \delta I \qquad (7)$$

This is a good enough approximation to provide good results. To find R, a multiple multivariate linear regression is performed on a large sample of known model displacements, $\delta c$, and the corresponding difference images, $\delta I$. These large sets of random displacements are generated, by perturbing the 'true' model parameters for the images in the training set by a known amount. As well as perturbations in the model parameters, small displacements in 2D position, scale, and orientation are also modelled. These extra 4 parameters are included in the regression; for simplicity of notation, they can, however, be regarded simply as extra elements of the vector $\delta c$. In order to obtain a well-behaved relationship it is important to choose carefully the frame of reference in which the image difference is calculated. The most suitable frame of reference is the shape-normalised face patch described above. A difference is calculated thus: for the current location of the model, calculate the image grey-level sample vector, $g_i$, by warping the image data at the current location into the shape-normalised face patch. This is compared with the model grey-level sample vector, $g_m$, calculated using equation 4:

$$\delta g = g_i - g_m \qquad (8)$$

Thus, equation 7 can be modified:

$$\delta c = R \delta g \qquad (9)$$

The best range of values of $\delta c$ to use during training is determined experimentally. Ideally it is desired to model a relationship that holds over as large a range of errors, $\delta g$, as possible. However, the real relationship is found to be linear only over a limited range of values. In experiments, the model used 80 parameters. The optimum perturbation level was found to be around 0.5 standard deviations (over the training set) for each model parameter. Each parameter was perturbed from the mean by a value between 0 and 1 standard deviation. The scale, angle and position were perturbed by values ranging from 0 to +/−10% (positional displacements are relative to the face width). After performing linear regression, an $R^2$ statistic is calculated for each parameter perturbation, $\delta c_1$ to measure how well the displacement is 'predicted' by the error vector $\delta g$. The average $R^2$ value for the 80 parameters was 0.82, with a maximum of 0.98 (the 1st parameter) and a minimum of 0.48.

Given a method for predicting the correction which needs to be made in the model parameters, an iterative method may be constructed for solving the optimisation problem. For a given model projection into the image, c, the grey-level sample error vector, $\delta g$, is calculated, and the model estimate is updated thus:

$$c' = c - R \delta g \qquad (10)$$

If the initial approximation is far from the correct solution the predicted model parameters at the first iteration will generally not be very accurate but should reduce the energy in the difference image. This can be ensured by scaling R so that the prediction reduces the magnitude of the difference vector, $|\delta g^2|$, for all the examples in the training set. Given the improved value of the model parameters, the prediction made in the next iteration should be better. The procedure is iterated to convergence. Typically the algorithm converges in around 5–10 iterations from fairly poor starting approximations.

The invention may be applied to the Active Appearance Model. In the general form, given appearance parameters, c, a synthetic image is generated, and a difference vector, I, between the synthetic image and the target image is computed. The appearance parameters are then updated using the equation:

$$c \rightarrow c - R \delta I$$

where R is a regression matrix relating the model displacement to the image errors, learnt during the model training phase.

Applying the invention, when the model is looking for a particular individual with known mean appearance co and variation described by B, then the parameters b can be manipulated as follows:

$$b \rightarrow b - R_B \delta I$$

$$c = c_o + Bb$$

where $R_B$ is a regression matrix learnt from the training set in a way analogous to that used for computing R, but learning the relationship between small changes in b and the induced image error.

When verifying that an image is of a particular object, it is assumed that the mean appearance, $c_o$, and the way in which the object may legitimately vary, B, ($c = c_o + Bb$) are known. The image is searched using an active appearance model manipulating the reduced set of parameters, b. The best fit will synthesise an image of the target object as close as possible to the target image. To verify that the object belongs to the required class, the difference between the best fitting synthesised image and the actual image, dI, is measured. If $|dI| < t_1$, where $t_1$ is a suitable threshold, the object is declared to be correctly verified.

The algorithm used in the prior art Active Appearance Model uses the same regression matrix, R, for all individuals. The seventh aspect of the invention uses a different R for each individual (i.e. for each subject's face). Specifically, if R is represented within a model with t parameters, x, i.e. R R(x), then the relationship between the parameters x and the mean appearance model parameters can be learnt for an individual, y, i.e.

$$x = g(y).$$

Thus, when searching for an individual with mean appearance model parameters, y, the model uses an update equation of the form:

$$c \rightarrow c - R(g(y)) \delta I$$

For example, consider one simple model having a single parameter, x, i.e.

$$R(x) = x R_0.$$

It may be that there is a relationship between distance from the origin and the best value of x, i.e. $x = a + b|y|$.

The regression matrix can be calculated at any point in the space, y, by using the model to synthesise an image for the parameters y, then generating large numbers of displacements, dy, and corresponding image errors δI. Linear regression can be used to learn the best R such that dy=RδI for the given y.

What is claimed is:

1. A method of identifying an object class using a model based upon appearance parameters derived by comparing images of objects of different classes, the model including a representation of a probability density function describing a range over which appearance parameters may vary for a given class of object, the model further including a defined relationship between the shape of the probability density function and the location of the probability density function in appearance space, wherein the method comprises:
generating appearance parameters representative of an unknown object,
estimating an appropriate probability density function for the unknown object based upon the location of the appearance parameters in appearance space and using the defined relationship between the shape of the probability density function and the location of the probability density function in appearance space,
then iteratively modifying at least some of the appearance parameters within limits determined using the probability density function to provide a set of appearance parameters which identify an object class.

2. A method according to claim 1, wherein a threshold level of the probability density function is determined, and the appearance parameters are constrained to have a probability density greater than the threshold.

3. A method according to claim 1, wherein the objects are faces, and a given class of object is a face having a particular identity.

4. A method according to claim 1, wherein the relationship between the appearance parameters and the probability density function is a relationship between average appearance parameters determined for each class of object, and probability density functions associated with each class of object.

5. A method according to claim 1, wherein the probability density function is a Gaussian function.

6. A method according to claim 1, wherein the probability density function is approximated as a Gaussian with a given covariance matrix.

7. A method according to claim 1, wherein the model is the Active Appearance Model.

8. A method of verifying the identity of an object class using a model based upon appearance parameters derived by comparing images of objects of different classes, the model including a representation of a probability density function describing the variation of appearance parameters for a given class of object, the model function including a defined relationship between the shape of the probability density function and the location of the probability density function in appearance space, wherein for an object class for which verification will subsequently be required, the method comprises:
using a series of images of that object class to generate a representation of a specific probability density function describing the variation of appearance parameters for that object class, and
during subsequent verification of the object class, comparing an image of an object of an unknown class with the object of known class by generating appearance parameters representative of the object of unknown class and iteratively modifying at least some of the appearance parameters within limits determined using the specific probability density function, to provide a set of appearance parameters which are compared with a predetermined threshold to provide verification.

9. A method according to claim 8, wherein a threshold level of the probability density function is determined, and the appearance parameters are constrained to have a probability density greater than the threshold.

10. A method according to claim 8, wherein the objects are faces, and a given class of object is a face having a particular identity.

11. A method according to claim 8, wherein the relationship between the appearance parameters and the probability density function is a relationship between average appearance parameters determined for each class of object, and probability density functions associated with each class of object.

12. A method according to claim 8, wherein the probability density function is a Gaussian function.

13. A method according to claim 8, wherein the probability density function is approximated as a Gaussian with a given covariance matrix.

14. A method according to claim 8, wherein the model is the Active Appearance Model.

15. A method of generating a synthesized image of an object class using a model based upon appearance parameters derived by comparing images of objects of different classes, the model including a representation of a probability density function describing the variation of appearance parameters for a given class of object, the model further including a defined relationship between the shape of the probability density function and the location of the probability density function in appearance space, wherein for an object class to be synthesized, the method comprises:
using a series of images of that object class to generate a representation of a specific probability density function describing the variation of appearance parameters for that object class, and
during subsequent synthesis of the object class, confining the appearance parameters used within limits determined using the specific probability density function.

16. A method according to claim 15, wherein a threshold level of the probability density function is determined, and the appearance parameters are constrained to have a probability density greater than the threshold.

17. A method according to claim 15, wherein the objects are faces, and a given class of object is a face having a particular identity.

18. A method according to claim 15, wherein the relationship between the appearance parameters and the probability density function is a relationship between average appearance parameters determined for each class of object, and probability density functions associated with each class of object.

19. A method according to claim 15, wherein the probability density function is a Gaussian function.

20. A method according to claim 15, wherein the probability density function is approximated as a Gaussian with a given covariance matrix.

21. A method according to claim 15, wherein the model is the Active Appearance Model.

* * * * *